United States Patent [19]

Müller et al.

[11] Patent Number: 4,822,829

[45] Date of Patent: * Apr. 18, 1989

[54] RADIATION-CURABLE MACROMERS BASED ON (METH)ACRYLATE-FUNCTIONAL POLYESTERS, AND THEIR USE

[75] Inventors: Hartmut Müller, Troisdorf; Hans Huber, Lohmar, both of Fed. Rep. of Germany

[73] Assignee: Huels Troisdorf Aktiengesellschaft, Cologne, Fed. Rep. of Germany

[ * ] Notice: The portion of the term of this patent subsequent to May 26, 2004 has been disclaimed.

[21] Appl. No.: 860,527

[22] Filed: May 7, 1986

[30] Foreign Application Priority Data

Jul. 5, 1985 [DE] Fed. Rep. of Germany ....... 3516351

[51] Int. Cl.[4] .......................... C08F 2/54; C08F 20/36; C08F 20/58

[52] U.S. Cl. ........................................ 522/90; 522/97; 522/104; 526/301; 526/320; 526/323.1

[58] Field of Search ...................... 528/49; 522/96, 97, 522/90, 104; 526/301, 320, 323.1

[56] References Cited

U.S. PATENT DOCUMENTS

| | | | |
|---|---|---|---|
| 3,053,783 | 9/1962 | Broadhead | 528/296 |
| 3,664,861 | 5/1972 | Okamura et al. | 117/93.31 |
| 3,673,140 | 6/1972 | Ackerman et al. | 260/22 TN |
| 3,686,360 | 8/1972 | Cunningham | 260/850 |
| 3,864,133 | 2/1975 | Hisamatsu | 522/90 |
| 3,979,426 | 9/1976 | DeMajistre | 522/96 |
| 4,080,316 | 3/1978 | Holda et al. | 260/75 R |
| 4,082,710 | 4/1978 | Vrancken | 522/96 |
| 4,147,737 | 4/1979 | Sein et al. | 260/835 |
| 4,158,618 | 6/1979 | Pastor | 522/100 |
| 4,164,486 | 8/1979 | Kudo | 522/96 |
| 4,172,822 | 10/1979 | Patzschke | 525/424 |
| 4,174,307 | 11/1979 | Rowe | 522/96 |
| 4,206,025 | 6/1980 | Vranken | 522/163 |
| 4,233,425 | 11/1980 | Tefertiller | 522/96 |
| 4,239,866 | 12/1980 | Reitel et al. | 525/440 |
| 4,423,179 | 12/1983 | Guagliardo | 524/539 |
| 4,451,627 | 5/1984 | Frisch | 526/192 |
| 4,605,681 | 8/1986 | Grey | 528/49 |
| 4,609,682 | 9/1986 | Weber | 528/49 |

FOREIGN PATENT DOCUMENTS

| | | |
|---|---|---|
| 54105 | 9/1981 | European Pat. Off. . |
| 2310128 | 10/1973 | Fed. Rep. of Germany . |
| 2824418 | 12/1978 | Fed. Rep. of Germany . |
| 3115072 | 11/1982 | Fed. Rep. of Germany . |
| 3213160 | 10/1983 | Fed. Rep. of Germany . |

OTHER PUBLICATIONS

PTO Translation of Leitner.

Saegusa; "New Developments in Polymer Synthesis", *New Trends in Chemistry,* 87–90, 94 (1982).

*Primary Examiner*—Lewis T. Jacobs
*Assistant Examiner*—Arthur H. Koeckert
*Attorney, Agent, or Firm*—Felfe & Lynch

[57] ABSTRACT

Radiation-setting (meth)acrylate-functional polyesters prepared from base polyesters which are fluid at room temperature and have molecular weights of 1,000 or more as well as aliphatic side chains bound to the main chain by ester bridges and, in some cases, ether bridges, and in which a maximum of 90% of the original hydroxyl groups of the base polyester are functionalized, are usable for coatings and especially as adhesives free of solvents.

24 Claims, No Drawings

RADIATION-CURABLE MACROMERS BASED ON (METH)ACRYLATE-FUNCTIONAL POLYESTERS, AND THEIR USE

BACKGROUND OF THE INVENTION

The subject matter of the present invention is radiation-setting polyesters which have functional (meth)acrylate groups, are branched in the main chain and/or have aliphatic side chains, and in which no more than 90% of the hydroxyl groups have been replaced by radiation-setting functional groups.

(Meth)acrylate-functional polyesters and polyester urethanes are known. They serve primarily as raw materials for lacquers which are crosslinked with reactive diluents and photoinitiators to form hard films. Without reactive monomers they are mostly fabricated from solutions. By the addition of tackifying resins it is possible to produce tacky-surfaced coatings with such (meth)acrylated oligomers or polymers.

The processes for making macromeric polymers from polymers, i.e., for making polymers which can be set by radiation by means of their functional groups, are various. For example, ways are described in DE-OS No. 28 38 691 and DE-OS No. 30 00 308, through the esterification of hydroxyl polyesters with acrylic acid. The problem with this process is that these esterification reactions do not take place completely, and therefore unreacted monomers are either removed by complicated distillation methods or they have to be bound by reaction with epoxides, for example. A way that combines both methods is described in EP-PS No. 0 054 105.

Another method is the reaction of hydroxyl polyesters with acid anhydrides and then with glycidyl esters of (meth)acrylate-functional monomers according to U.S. Pat. No. 4,158,618, in which an internal photoinitiator is installed in the polymer by the use of halogenated, cyclic anhydrides.

Often the introduction of (meth) acrylate groups into polyesters is accomplished through diisocyanates; either isocyanato prepolymer is produced, which is then reacted with a hydroxyl (meth)acrylate, or the polyester is reacted with an adduct of diisocyanate and hydroxyalkyl (meth)acrylate (U.S. Pat. 4,174,307 and U.S. Pat. 4,164,486).

In U.S. Pat. 4,174,307, monomers or oligomers containing (meth)acrylate groups and having very low molecular weights are used. The (meth)acrylated polyesters according to U.S. Pat. 4,164,486 are polyesters which contain dimeric fatty acid and ethoxylated bisphenol A to improve their adhesion to metals. On the basis of their composition, these products are solid at room temperature and, at higher molecular weights, they have such great viscosities that they can be fabricated only from solution and/or with the addition of monomeric reactive diluents. The preparation of acrylate-functional polyethers by reaction with isocyanatoalkyl(meth)acrylate is described in U.S. Pat. 4,233,425.

The known (meth)acrylate-group-containing polyesters which are accessible through diisocyanates have it in common that they are either built up mostly linearly by the functional polyester components, or, if the main chain is branched, they are formed from polyesters of low degrees of condensation. If high viscosities occur after the functionalization, especially in the case of branched base polyesters of high molecular weight, the products are fabricated from solutions and/or with large additions of monomeric reactive diluents. To obtain hard, scratch-resistant coating films after the crosslinking, additional unsaturated monomers are installed and/or the hydroxyl groups are substituted as completely as possible with polymerizable acrylic groups, in spite of the difficulties described above.

The problem therefore existed of developing (meth)acrylate-group-containing macromers on the basis of polyesters which are still liquid at room temperature despite relatively high molecular weight, and can therefore be processed without solvents. At the same time, even in the case of the incomplete replacement of the hydroxyl groups of the polyester with isocyanates containing unsaturated groups, it is to be possible to achieve a sufficient cohesive build-up of the polyesters by electron radiation without monomeric reactive diluents and photoinitiators.

THE INVENTION

The stated problem has been solved by using those base polyesters which bear aliphatic side chains bound by ester bridges or, in some cases, ether bridges, to the main chain. To assure sufficient cohesion, these polyesters must have molecular weights of from 1,000 to 10,000. By the branching of the main chain it is furthermore sufficient to replace 10 to 90% of the hydroxyl groups originally present in the polyester, with polymerizable, unsaturated functional groups which cure reactively by the effect of radiation. The addition of other monomeric unsaturated compounds is therefore not necessary for the achievement of complete crosslinking. In order then to obtain products that are still fluid even at relatively high molecular weights, the base polyesters must be amorphous products having glass transition temperatures of less than 0° C., preferably under −20° C. This can be achieved on the one hand by selecting mostly aliphatic polycarboxylic acids and polyols. Examples of such aliphatic buildign blocks are dicarboxylic acid diols with alkyl side chains of 2 to 18 carbon atoms, as well as triols, such as for example trimethylolpropane, glycerol, pentaerythritol etc. Just as elegant, however, is the introduction of aliphatic side chains, which is possible through partial esters of a polycarboxylic acid with aliphatic monoalcohols or through partial esters of a polyol with aliphatic monocarboxylic acids or, in some cases, through partial ethers of polyols with aliphatic monoalcohols, the structure of the partial esters being such that an average functionality of 2 to 3 results. A functionality of 2 is to be understood as the functionality of a linear, unbranched polyester in which the number of the polyester bonds in a unit of polycarboxylic acid and polyol amounts to 2, while either no additiona carboxyl or hydroxyl groups are present at this unit, or they are closed by monocarboxylic acids or monoalcohols. In like manner, a functionality of 3 will result on such a polyester unit of polycarboxylic acid + polyalcohol if a side chain of the polyester is bound to this unit in average through an additional carboxyl or hydroxyl group.

The subject matter of the invention, therefore, is radiation-setting macromers on the basis of (meth)acrylate-functional polyesters, characterized in that (a) base polyesters containing hydroxyl groups and having average molecular weights of 1,000 to 10,000, which are in the fluid state at 20° C. and which contain alkyl side chains with 4 to 36 carbon atoms in the alkyl group bound to the main chain by ester groups or ether bridges of third or higher polyester-forming functions, and in which 10 to 90% of the hydroxyl groups of the polyesters have been reacted with (b) acrylate compounds and/or methacrylate compounds selected from:

(b1) isocyanatoalkyl (meth) acrylate and/or (b2) adducts of di- or triisocyanates or polyisocyanates or isocyanato prepolymers of polyesters or polyethers of low molecular weight with hydroxyalkylacrylates or hydroxyalkylmethacrylates and/or (b3) methylacrylamidoglycolate methyl ethers and/or (b4) methacrylic acid or acrylic acid or their derivatives and/or (b5) upon the reaction of 10 to 90% of the hydroxyl groups with dicarboxylic acid, tricarboxylic acid or their derivatives, the carboxyl groups thus formed, subsequently been reacted with glycidyl acrylate or glycidyl methacrylate.

The term, "ester segment of the polyesters" as used herein, is to be understood to refer to the repeating group $$-\underset{\underset{O}{\|}}{C}\!\nearrow\!\underset{\underset{O}{\|}}{C}-O-\searrow-O-$$

composed of di- or tricarboxylic acid, and ⤫ is to be understood as its hydrocarbon moiety and a diol or triol with ⤥ as its hydrocarbon moiety, wherein the alkyl side chain is bound by a third polyester-forming function, i.e., a third carboxyl group of the tricarboxylic acid or a third hydroxyl group of the triol.

The new polyesters are not crosslinked and are largely linear, i.e., built up of unbranched main chains with only comparatively little chain branching due to trifunctional links of the main chain, although tricarboxylic acids or higher polycarboxylic acids and, in some cases, triols or more highly functional polyols are necessarily to be used with them.

The new base polyesters have entirely or predominantly a comb structure—as seen in a simplified planar projection—or a structure in which the alkyl side chains project in a random, statistical arrangement from the substantially linear and unbranched main chain of the polyesters.

In the polyesters according to the invention, the alkyl side chains stem from monocarboxylic acid moieties or from monoalkanol moieties which are bound in the ester segments at third functions, i.e., carboxyl groups or ether bridges of tricarboxylic acids or, in some cases, tetracarboxylic acids, or of triols or, in some cases, tetraols. The alkyl side chains are bound substantially uniformly along the main chain of the polyesters, i.e., the ester segments of the main chain composed of dicarboxylic or polycarboxylic acids, diols or polyols and dihydroxymono- or hydroxydicarboxylic acids have, at least partially, carboxyl groups or ether groups with alkyl moieties of monocarboxylic acids or monoalcohols.

It is necessary according to the invention that substantially a functionality of the polyester-forming components of only two or little more be present in the polyester main chain, i.e., that only 2 carboxyl groups of the polycarboxylic acids or only 2 hydroxyl groups of the polyols, or only an average of 2 polyester-forming hydroxyl or carboxyl groups of a hydroxypolycarboxylic acid be bound in the main chain of the polyesters, although tricarboxylic acids or higher polycarboxylic acids and triols or higher polyols are used in addition to dicarboxylic acids and diols. The third carboxyl group of the tricarboxylic acids and the third hydroxyl group of the triols will bear the alkyl side chain described, according to the selection of the starting substances and the conditions of preparation.

Provision is therefore made according to the invention for using preferably alkyl esters of at least trifunctional carboxylic acids, especially monoesters of tricarboxylic acids and diesters of tetracarboxylic acids, but also dialkyl esters of tricarboxylic acids and, in some cases, trialkyl esters of tetrafunctional carboxylic acids or aliphatic monoesters of triols and diesters of tetraols, but also diesters of aliphatic carboxylic acids of triols and triesters of aliphatic carboxylic acids of tetraols as starting substances in addition to the common dicarboxylic acids and diols or hydroxycarboxylic acids. Preferred are glycidyl esters of monocarboxylic acids and mono- to trialkyl esters of tricarboxylic acids, while in the formation of the polyester one alkyl ester group of the monocarboxylic acid is preserved in the polyester, while additional alkyl ester groups are cleaved off in a conventional manner. Also preferred are trimethylolpropane esters of monocarboxylic acids. According to the invention, however, it is also possible in many cases, instead of setting out from, especially, monoesters of polycarboxylic acids or monocarboxylic acid esters of polyols, to set out from the individual components, tri- and higher polycarboxylic acids plus monoalcohol or triol or higher polyols plus monocarboxylic acid, and even combinations of polycarboxylic acid and monocarboxylic acid, and polyol and monoalkanol are possible. This is not, however, preferred.

According to the invention, it is decidedly preferred to use branched alcohols in the form of their esters or as single components, or branched monocarboxylic acids in the form of their esters or as single components, for the building up of the alkyl side chains.

Known aliphatic di-, tri- and higher polycarboxylic acids, aromatic di-, tri- and polycarboxylic acids, dihydroxymonocarboxylic acids and hydroxydicarboxylic acids can be used, as well as monoalkyl and dialkyl esters of the above-mentioned difunctional and higher-functional carboxylic acids, mono- or dicarboxylic acid esters of diols and higher polyols, or dimonocarboxylic acid esters and mono- or dialkyl esters of mono- or dihydroxymonocarboxylic or dicarboxylic acids, as well as the monoalkyl and dialkyl esthers of diols and higher polyols, as well as the monocarboxylic acids and monoalkanols themselves.

The following difunctional and polyfunctional, polyester-forming starting substances are preferred for the construction of the main chain of the polyesters:

as trifunctional and polyfunctional polycarboxylic acids: trimellitic acid, trimesinic acid, hemimellitic acid, pyromellitic acid and their polyester-forming derivatives and, very preferentially, trimellitic acid anhydride and trimellitic acid monoalkyl ester and trimellitic acid dialkyl ester and trialkyl ester;

as dicarboxylic acids, for example: terephthalic acid, hexahydrophthalic acid, tetrahydrophthalic acid, isophthalic acid, phthalic acid and aliphatic dicarboxylic acids with 2 to 12 carbon atoms as well as their polyester-forming derivatives, such as azelaic acid, sebacic acid and dodecanic acid;

as triols and polyfunctional polyols: glycerol, pentaerythritol and, very preferentially, trimethylolpropane, trimethylolethane, di-trimethylolpropane ether and their esters and ethers, glycidyl esters of monocarboxylic acids, especially of the so-called versatic acids;

as mono- and dihydroxycarboxylic acid, for example: hydroxysuccinic acid (malic acid), and, as diols, aliphatic diols with 2 to 6 carbon atoms, such as monoethylene glycol or hexanediol, as well as ether diols such as diethylene glycol, triethylene glycol, up to polyether glycols with molecular weights of 1,000.

For the formation of the alkyl side chains, straight-chain or branched alkanols or aliphatic monocarboxylic acids with 4 to 36, preferably 4 to 18 carbon atoms, or the mono-or, in some cases, diethers of the named tri- or more functional polyols, polycarboxylic acids or hydroxycarboxylic acids, are preferred.

Much preferred are branched-chain alkanols, especially 2-ethylhexanol or, in some cases, tert.-butanol as well as branched-chain aliphatic monocarboxylic acids such as 2-ethylhexanic acid, isononanic acid or alpha,alpha-dialkylmonocarboxylic acids in the form of the versatic acids, e.g., with 9 to 11 carbon atoms.

Also decidedly preferred are saturated polyester-forming starting substances, i.e., saturated diols and dicarboxylic acids, saturated tricarboxylic acid esters or, in some cases, tricarboxylic acid, saturated triols and, especially, glycidyl esters or, in some cases, glycerol. However, even smaller proportions of unsaturated startig substances can be used, up to about 2 mol-%, e.g., maleic acid anhydride or fumaric acid.

The problem to which the invention is addressed can be solved to special advantage by the use of trimelliticacid-mono-2-ethylhexylester or a mixture of trimellitic acid anhydride and 2-ethylhexanol. Also preferred are trimethylolpropanemonoesters, especially trimethylolpropane-mono-2-ethylhexanic acid ester.

In the polyesters according to the invention, the molar ratio of ester segments of the main chain to side chains is to amount to 1 to 0.02 to 2.0. The ester segment of the main chain in this case is to be understood to be the bivalent moiety of a dicarboxylic acid moiety bound to a diol moiety, regardless of whether or not this ester segment bears additional carboxyl groups or hydroxyl groups. Such a molar ratio of 1.0 to 4.0 would be conceivable, yet polyesters, especially linear polyesters, can be achieved only with difficulty from a dialkanol ester of a tetracarboxylic acid and the dialkanol ester of a tetraol. On the other hand, a polyester with the said molar ratio of 1.0 to 2.0 with an average of one alkyl side chain per dicarboxylic acid moiety and one alkyl side chain per diol moiety can be prepared, for example, from trimelliticacid-mono-2-ethylhexylester and trimethylolpropane-2-mono-2-ethylhexanoate and is useful.

Molar ratios of ester segments of the main chain to the side chain of 1.0 to 0.05 to 1.0 are preferred. The polyesters according to the invention have remarkable properties.

In particular, any branching of the polyester chains is largely prevented, so that not only the participating diols and dicarboxylic acids, but all of the polyols, have an average of 2 hydroxyl groups available for the formation of polyester, all the polycarboxylic acids also have 2 carboxyl groups for the formation of polyester in the ester segments of the main chain, and in hydroxycarboxylic acids, too, 2 of the functional groups contribute to the formation of ester segments of the main chain. A slight branching of the polyester chains, however, is not avoidable and can be tolerated.

In the polyesters according to the invention, the setting points are preferably under 0° C., and very preferably under −20° C.

At the same time the polyesters have a broad molecular weight distribution and molecular weights from about 1000 to about 10,000 or more, 2,000 to 5,000 being preferred. The hydroxyl number is between 10 and 100, preferably 20 to 60 mg KOH/g. The polyesters are fluid at 20° C. The setting points are below −10° C., mostly even substantially lower. The viscosities in Pa.s at 20° C. are between 70 and about 5,000.

The new side-chain polyesters have the special property that a substantial decrease of the viscosity is brought about by only a slight elevation of the temperature. Thus the object of making polyesters available that can be processed without solvent, is achieved.

On the basis of their structure, the polyesters according to the invention are amorphous.

It is very remarkable that the stated object can be accomplished not only with aliphatic dicarboxylic acid components or aliphatic polycarboxylic acid components, but also with aromatic dicarboxylic acid and polycarboxylic acid components, and even with an exclusive content of aromatic polycarboxylic acids, although a polyester composed, for example, of terephthalic acid and ethylene glycol is solid at 240° C. and has a setting point of 73° C., which cannot be substantially lowered even by using a mixture of aromatic dicarboxylic acids.

According to the state of the art, polyesters with low setting points had to have a high content of aliphatic dicarboxylic acids or diols, so that their adhesion to polar surfaces when used as adhesives, especially metals, is very low.

The polyesters according to the invention, even with very high contents of aromatic building blocks, have a low melt viscosity and low setting points, and they have an excellent adhesion to metal.

The setting point of the described polyesters with equal proportions of aromatic dicarboxylic acids is substantially lower than that of the known polyesters.

The setting point diminishes with higher molar content of alkyl side chains and with increasing length of the alkyl side chains. An example of this is shown in Table 1. However, whether the alkyl side chain is bound to the dicarboxylic acid component or the diol component of the ester segments, and whether the bond is through an ether bridge or an ester group, has but little influence on the properties.

The substantially lowered melt viscosity of the polyesters according to the invention is of special importance for low-solvent or solvent-free fabrication, the lowering of the viscosity being able to be controlled by the number and length of the side chains. The addition of plasticizers or reactive diluents can therefore be dispensed with, unlike the case of the known polyesters.

The use of polyesters according to the invention depends especially on their character as hydroxyl polyesters, so that a transposition with reactive or crosslinkable compounds, such as isocyanates, melamine resins or benzoguanamine resins, epoxides, silane esters or the like is anticipated, by which the polyesters according to the invention become crosslinkable. Furthermore, the hydroxypolyesters can be reacted with carboxylic acid anhydrides and then crosslinked with epoxides or polyoxazolines, and peroxide or radiation hardening can be performed after functionalization with unsaturated groups.

Due to the properties of the polyesters according to the invention, coating or adhesives become more elastic and more cold-resistant. Functionalized products prepared from the polyesters according to the invention can be used as reactive adhesives, especially for bonding materials of the same or different quality, such as metals, plastics, glass, ceramic, leather etc., and they can be applied at lower temperatures. The cured compositions have very good elasticity combined with good strength. On account of their low setting points, the described polyesters are suitable as liquid polyesters especially for use in duplexing and pressure-sensitive adhesives, and better adhesion especially to polar substrates is achieved than with known liquid esters. The stickiness can furthermore be influenced by the nature and amount of the alkyl side chains. Additions of stickifying resins, pigments, anti-aging agents, and fillers such as silica, chalk, etc., are possible.

There are substantially two approaches to the manufacture of the polyesters according to the invention. The monocarboxylic acids and monoalkanols can be reacted (prior to the formation of the polyesters) with tri- or polyfunctional dicarboxylic acids or their anhydrides or their ester-forming derivatives, especially the methyl esters or the tri- or polyfunctional polyols, to form monoesters or, in some cases, diesters or the monoethers or, in some cases, diethers. This procedure is advisable especially in the case of the hard-to-esterify versatic acids and, in some cases, also in the case of branched alcohols such as 2-ethylhexanol. The versatic acids can be incorporated by using the corresponding commercially available glycidyl esters, reacting them preferably first with a dicarboxylic acid, such as an aliphatic dicarboxylic acid for example, and in a second step with aromatic dicarboxylic acid anhydrides, and then additional polyester raw materials can be added.

On the other hand, monocarboxylic acids and/or monoalkanols can be present in the esterification and polyester formation, in which case even an excess of the monofunctional side-chain-forming compounds is possible and desirable. The transesterification and polyester formation can be promoted by catalysts. Also, the statistical distribution can be promoted by lowered esterification temperatures and longer esterification time. In general, the tempertures in the esterification and polyester formation are around 180 to 260° C., preferably 200° to 240° C.

The the end of the polycondensation the pressure is preferably lowered to 10 to 20 mbar.

Branched alkyl groups, especially in preformed esters of tricarboxylic acid alkyl esters and glycidyl versatic acid esters, are hardly at all split off in the polycondensation according to the invention. It is possible, but not preferred, to use monoalkanols together with tricarboxylic acids or triols and aliphatic monocarboxylic acids together with triols in the polycondensation, and thus to form the alkyl side chains during the polycondensation.

It is, however, decidedly to be preferred to preform such monoesters or monoethers or the di- and triesters, in which all of the monofunctional alkyl side groups are split off except one per mol.

According to the invention, it is preferred in the new side-chain polyesters that no conventional branch chains extend from 90% or more of the ester segments.

In the preparation of the polyesters it is possible to confirm that the alkyl moieties of monoalcohols bound to the third function of tricarboxylic acids and of monocarboxylic acids bound so the third function of triols have not been split off and have been retained in the hydroxyl polyesters; this can be accomplished simply by analyzing the distillate of the esterification and polycondensation.

Alkyl side chains bound to first and second functions of polyester-forming components, e.g., methanol in dimethyl terephthalate and two alkyl groups in tricarboxylic acid esters, however, are split off and occur in the distillate as free alkanols or monocarboxylic acids.

An excess of diols plus triols or their esters or derivatives in relation to dicarboxylic acids plus tricarboxylic acids or their esters or derives is used and, as the polycondensation proceeds, the excess of the diol is removed until hydroxyl numbers of 10 to 100 and acid numbers lower than 5, preferably lower than 3, and very preferably lower than 1, are achieved.

In the removal of the last amounts of excess diol and the lowering of the hydroxyl numbers to the final value, no crosslinking must occur due to the splitting off of alkyl side chains, which is indicated by the sticking of the stirrer, a rapid increase of the viscosity by at least one power of ten, and the formation of a tough elastic mass. Such a spoiled batch is to be repeated in the same manner, but in this case the final hydroxyl number is higher by 5 than the last-measured hydroxyl number of the spoiled batch, or in some cases the final temperature of the polycondensation is to be lowered by 10° C. or the pressure is to be increased to 40 to 50 mbar.

Another way is the use of tricarboxylic acid trialkyl esters (cf. Example 1) instead of equal molar amounts of the monoesters or of the ester of Example 1*b*). Trimethylolpropane monoesters (Example 1*a*) and especially glycidyl esters, especially those of all versatic acids, have proven to be very stable.

The preparation of the hydroxyl polyesters with alkyl side chains according to the invention is accomplished by a method for the preparation of polyesters with hydroxyl numbers of 10 to 100 from bifunctional and polyfunctional starting substances, while diols present in excess during the polyester formation are removed in the course of the polyester formation, characterized by the fact that aliphatic diols and aliphatic, cycloaliphatic or aromatic dicarboxylic acids are used as difunctional polyester-forming components, tri- or polycarboxylic acids, tri- or polyols or hydroxycarboxylic acids, their polyester-forming derivatives and monoalkanols and/or aliphatic monocarboxylic acids are used as trifunctional components in the form of free compound or as ester or ether of the trifunctional polyester-formign components, one or more moles of monoalkanol or aliphatic monocarboxylic acid being present for at least every third or higher carboxyl or hydroxyl function of the trifunctional polyester-forming components, and are reacted to form polyesters.

The determination of the setting point (Tg) was performed with a differential calorimeter, Perkin-Elmer Model DSC 1.

The terminal group concentration is measured by the acid number, the hydroxyl number, both expressed in mg KOH/g, and by the carboxyl number expressed as MVal.COOH per kilogram of polymer according to H. Pohl, Analytic, Chem. 26 (1954), 1614.

The stated molecular weights are average molecular weights based on measurements by gel permeation chromatography (GPC) and on estimations based on the peaks indicating the centers of gravity of the molecular weights, or they are mean molecular weights computed from the hydroxyl number.

Especially preferred is the use of the new polyesters as pressure-sensitive adhesives, after 10 to 90% of the hydroxyl groups have been replaced by methacrylic groups or acrylic groups, by crosslinking with electron beams or ultraviolet radiation. In the case of ultraviolet radiation, a photosensitizer, for example as described in Polymers Paint Colour Journal, Vol. 175 (April 1985), pages 247 to 250, is added in amounts of 1% before the crosslinking. The polyesters can be reacted according to the examples identified by a letter F with basically any acrylic compounds and methacrylic compounds which contain an additional group reactive with hydroxyl groups, such as the isocyanate group, an ether group or a glycidyl group, while in the case of glycidyl acryates and methacrylates first a carboxyl polyester is to be made by reaction with dicarboxylic acid.

The term, "pressure-sensitive adhesives," as used herein, is to be understood to mean surface coatings on paper, plastic or the like, which have the special property of permanent stickiness. This preferred use is especially suitable for the claimed polyesters, since in this manner pressure-sensitive adhesives can be made which do not contain solvents or diluents which interefere with the crosslinking.

The transposition of 10 to 90% of the hydroxyl groups of the polyesters with an acrylate compound is performed in a second step, resulting in the replacement of 10 to 90% of the hydroxyl groups present with acrylate groups. The nature of the acrylate compounds or methacrylate compounds is unimportant as long as the compound in question has an additional group which is capable of reaction with the hydroxyl group of the polyesters.

In the simplest case, the acrylic acid, methacrylic acid or acrylic chloride or methacrylic chloride or the anhydrides of acrylic acid or methacrylic acid can be used.

This functionalization according to (b5) is not preferred, because these compounds are difficult to handle. The usual polymerization inhibitors, as described under (b2), must be added.

According to (b1), isocyanatoalkylacrylate or isocyanatoalkyl methacrylate can be used for the functionalization, alkyl having the meaning of ethyl or propyl.

According to (b2), adducts which have an isocyanato group and an acrylate moiety or a methacrylate moiety can be used in a ratio of 1:1. These adducts are prepared prior to the reaction with the hydroxyl polyesters from, on on the one hand, diisocyanates or, in some cases, polyisocyanates or isocyanato prepolymers of polyesters or polyethers of low molecular weight which have two isocyanate groups in the molecule and, on the other hand, from approximately equivalent molar amounts of hydroxyalkylacrylates or hydroxyalkylmethacrylates.

The preferred isocyanates are toluylene diisocyanate, methylenediphenyl-4,4'-diisocyanate, hexamethylenediisocyanate, benzene-1,4-diisopropylisocyanate, isophoronediisocyanate and other diisocyanates. In like manner, triisocyanates can be used, which are also reacted with two mols of hydroxyl alkyl acrylate. Isocyanate prepolymers can be used in prepared form, for example as Desmodur PF (Bayer AG), or can be made from triethylene glycol, for example, by reaction with the above-named diisocyanates. In like manner, a reaction product of a molecular size of 3 or 5 from 2 mols of ethylene glycol and 1 mol of a dicarboxylic acid can be reacted with one of the diisocyanates and afterward reacted with hydroxyl alkyl acrylates, so that the said adduct is formed.

For the formation of the adducts, temperatures of 50° to 120° C. are sufficient. It is necessary to operate with the exclusion of atmopsheric moisture, and to verify the reaction of the isocyanates and polyisocyanates down to a remainder of about 10% by analysis.

Also, according to (b3), methylacrylamidoglycolate methyl ether (MAGME) made by Dyno Cyanamide C.V. of Rotterdam, or the corresponding acrylamidoglycolate methyl ether, can be used. Here a transetherification is performed, and the methanol that is released under the reaction conditions stated below is removed.

Also, according to (b5), a reaction of 10 to 90% of the hydroxyl groups of the polyester with a dicarboxylic acid can be performed, or preferably with an anhydride of a dicarboxylic acid, such as for example phthalic acid anhydride, or any other aliphatic or aromatic dicarboxylic acid anhydride. This reaction is best performed directly after the formation of the polyester. The desired amount of the hydroxyl groups is preserved by controlling the amount of the dicarboxylic acid anhydride. Then the carboxyl groups developed by reaction of the dicarboxylic acid or of the dicarboxylic acid anhydride are reacted with glycidyl acrylate or glycidyl methacrylate, preferably with the addition of a polymerization inhibitor.

Unless otherwise stated, the reaction of the hydroxyl groups of the polyester with 1.0 to 1.1 mol of substances (b1) to (b5) per mol of the hydroxyl groups to be reacted takes place at 60° to 150° C. and pressures of from 300 mbar to standard pressure, with the exclusion of atmospheric moisture.

The reaction with the acrylate compounds or methacrylate compounds can be performed in like manner on previously prepared polyesters, at the stated temperatures. Any other acrylate compounds and methacrylate compounds can be used which are capable of reaction with the hydroxyl groups or with carboxyl groups of a carboxyl polyester (which forms from the hydroxyl polyester by reaction with dicarboxylic acid anhydrides).

In this manner the acrylate-functional or methacrylate-functional macromers are formed, which by radiation crosslinking yield pressure-sensitive adhesives, 2 to 5 Mrad being sufficient in the thin coating used, on account of the surprisingly high reactivity of the functionalized macromers.

Because of the low viscosity of the functionalized macromers it is possible to apply 5 to 200 g of macromers in a single operation to paper or plastic films, using a wine rod or roller for example, at 50° to no more than 100° C., and to crosslink the macromer layer with an electron beam radiator (EB) or with ultraviolet radiation, to form the pressure-sensitive adhesive. In the case of ultraviolet radiation crosslinking, a photoinitiator or photosensitizer is to be added to the macromers in amounts of 0.5 to 1.5%, and this can be done directly after the macromers are made. Suitable photoinitiators are described in Polymers Paint Colour Journal, vol. 175 (April 1985), pages 247 to 250.

In the Examples, the examples of functionalization are distinguished with an F and the examples of crosslinking are distinguished with a V.

EXAMPLES

Example 1

In a reactor surmounted by a column and equipped with a control thermometer and contact thermometer, the triester of 464 g (2.417 mol) of trimellitic acid anhydride and 990 g (7,615 mol) of 2-ethylhexanol is prepared by esterification at 160° to 210° C. within 5 hours, while maintaining a column-top temperature of about 102° C., using 0.75 g of octylene glycol titanate as catalyst. When an acid number of less than 3 mg KOH/g is reached, 333 g (3,142 mol) of diethylene glycol is added and the column is closed. After changing over to a distillation bridge the mixture is transesterified and 2-ethylhexanol is distilled out at 200° to 230° C. such that the vapor temperature does not exceed 165° C. When the vapor temperature, at an internal temperature of 230° C., drops to less than 100° C., a vacuum is applied (800 mbar, diminishing to 300 mbar), so that the vapor temperature ranges from 100° to 165° C. Transesterification is performed in this manner until the terminal characteristics are reached. Then the vacuum is relieved with nitrogen and the product is cooled.

| | | |
|---|---|---|
| Characteristics: | Acid number | <0.2 mg KOH/g |
| | Hydroxyl number | 40.0 mg KOH/g |
| | $V_{20}$ | 88 Pa.s |
| | Tg | −38° C. |
| | M = 4,000–5,000 | |

In the distillate of the batch, 676 g of 2-ethylhexanol and 84 g of diethylene glycol were found. It is calculated from this that, in the product prepared, 1 mol of 2-ethyl hexanol per mol of trimellitic acid is bound and is contained as side chain, which is confirmed by analyses. The ratio of ester segments to alkyl side chains is 1 : 1 mol.

In subsequent batches of this alkyl side chain polyester, the distillate can be used as a source of 2-ethylhexanol, in which case, when the polyester is formed, the amount of diethylene glycol is reduced by the amount already added.

Example 2

13.57 kg of glycidyl ester of versatic acid 10 (Shell's Cardura(R) E10)[1] were heated in a reactor equipped with a superimposed column and a control thermometer and contact thermometer, to 110° C. in a nitrogen atmosphere, with stirring. Then 4.35 kg of adipic acid and 67 g of Dynapol A1V(R)$_2$ were added to the glycidyl ester. The formation of glycidyl adipate took place with a slight exothermic reaction which resulted in a temperature rise to 140° C. The temperature was maintained at 140° C. for 30 minutes. This was followed by the addition of 8.81 kg of phthalic acid anhydride and 5.52 kg of diethylene glycol. The contents of the reactor were heated to 235° C. over a period of 1 hour. After 5 hours at 235° C., 22 g of octylene glycol titanate was added and a vacuum of 150 mbar was applied. The pressure was lowered over a period of 2 h 30 min to 10 mbar, and then further reduced to 5 mbar. After 4 h under these conditions, the condensation was terminated by breaking the vacuum and cooling the product. The product had an acid number of less than 1 mg KOH/g and a hydroxyl number of 40 mg KOH/g, as well as a viscosity $V_{20}$ of 4,350 Pa.s.

*[1] Glycidyl ester of the versatic acid of a total carbon number 10 with alpha, alpha' chain branching by mostly methyl groups with a smaller amount of ethyl groups.

*[2] Adduct of phosphorous acid and 3 mol of glycidyl ester of versatic acid 10 (Shell's Cardura(R) in accordance with European patent EP-A1 0 177 912, as protection against oxidative degradation.

The setting point is −15° C.

M =2,800 to 3,800.

In the distillate only the excess diethylene glycol was found, but virtually no versatic acid. Accordingly, the versatic acid moiety is bound to the glycerine moiety of the polyester as an alkyl side chain. This was confirmed by analyses. The ratio of ester segments to alkyl side chains amounts to 1 : 0.53 mol.

Example 3

In a reactor surmounted by a column and equipped with a control and a contact thermometer, the following were charged, with stirring, under a nitrogen atmosphere with simultaneous heating: 13.42 kg of trimethylol propane/2-ethylhexanic acid monoester (Example Ia), 1.88 kg of monoethylene glycol, 5.00 kg of 1,6-hexanediol, 7.37 kg of adipic acid, 8.38 kg of isophthalic acid, and 45 g of DYNAPOL A1V(R)[2]. The splitting off of water begins at about 140° C., and is performed under the control of the column top temperature (approximately 105° C.). The final temperature of 240° C. is reached in 2 to 3 hours. After 5 to 6 hours, 3.70 kg of distillate has been produced.

*[2] See footnote 2 above 15 g of octylene glycol titanate is added and a vacuum is applied. After about 3 h, with pressure reduction to 10 mbar, the final characteristic data are reached. The vacuum is relieved with nitrogen and the product is cooled.

| | | |
|---|---|---|
| Characteristics: | Acid number | 1 mg KOH/g |
| | Hydroxyl number | 33 mg KOH/g |
| | $V_{20}$ | 948 Pa.s |
| | Tg | −34° C. |
| | M = 3,200–4,800 | |

The excess ethylene glycol is found in the distillate, but virtually no hexanediol and 2-ethylhexanoic acid. Accordingly, the moiety of the 2-ethylhexanoic acid is bound as an alkyl side chain to the trimethylolpropane moiety in the polyester; this is confirmed by analyses. The ratio of the ester segments to alkyl side chains is 1 : 0.40 mol.

Examples 4 to 11 and Examples A to C given for comparison

Example 11 is performed as follows: 50.6 g of monoethylene glycol (0.817 mol) and 0.122 g of butyltitanate in a 36.8% solution in 2-ethylhexanediol-1,3 were heated under a nitrogen atmosphere with 97.0 g of monoester of the 2-ethylhexanic acid of trimethylol propane (0.35 mol) in a round flask surmounted by a column and provided with thermometer and stirrer. At about 80° C., 136 g of a dicarboxylic acid mixture (C4-C6) (1 mol) was added. Over 30 minutes the temperature was raised to 150° C., with incipient splitting off of reaction water. After 4 hours 140° C. was reached, at an acid number of 14.5 mg KOH/g. After another 60 minutes the acid number was 14.0 mg KOH/g. A vacuum of 100 mbar was applied and reduced to 20 mbar. After 3 hours the vacuum was broken to terminate the condensation, and the product was cooled. The product had an acid number of 1.4 mg KOH/g and a hydroxyl number of 40 mg KOH/g, and a setting point of less than −20° C.

Examples 4 to 10, and Examples A to C given for comparison, are prepared from the components contained in Table 1, in the molar ratios and under the same conditions as in Example 11, using the same excess of ethylene glycol. The polycondensation is broken off at to 220° C., the distillate is separated by means of a Vigreux column, the top temperature amounts to 100° to 105° C. The bath temperature is maintained until the top temperature falls below 80° C. The product has an acid number of 150±10 mg KOH/g. 1.7 mol of 2-ethylhexanol per mol of trimellitic acid is contained in the product.

TABLE 1

Molar ratios and properties of the polyesters

| Example | IS | TPS | PS | DCS | AS | TTE | MEG | DEG | HD | GV | TMME | Tg. (°C.) | Visc. Pa.s °C. |
|---|---|---|---|---|---|---|---|---|---|---|---|---|---|
| 1 | — | — | — | — | — | $100^{x}$ | — | 100 | — | — | — | −38 | 80 |
| 2 | — | — | 67 | — | 33 | — | — | 47 | — | $53^{xx}$ | — | −15 | 4,350 |
| 3 | 50 | — | — | — | 50 | — | 25 | — | 35 | — | $40^{x}$ | −34 | 950 |
| 4 | — | 25 | 25 | — | — | $50^{xxx}$ | 100 | — | — | — | — | −10 | 3,100 |
| 5 | — | — | — | — | — | $100^{xxx}$ | 100 | — | — | — | — | −53 | 1,200 |
| 6 | — | 20 | 20 | 60 | — | — | 70 | — | — | — | $30^{x}$ | −22 | 1,800 |
| 7 | — | 20 | 20 | 60 | — | — | 70 | — | — | — | $30^{x3}$ | −30 | 1,900 |
| 8 | — | 10 | 10 | 60 | — | $20^{xxx}$ | 100 | — | — | — | — | −23 | 2,000 |
| 9 | — | 10 | 10 | 60 | — | $20^{x2}$ | 100 | — | — | — | — | −25 | 1,700 |
| 10 | — | — | — | 60 | — | $40^{xxx}$ | 100 | — | — | — | — | −31 | 300 |
| 11 | — | — | — | 100 | — | — | 70 | — | — | — | $30^{x}$ | −41 | 130 |
| A | — | 50 | 50 | — | — | — | 100 | — | — | — | — | +55 | solid |
| B | — | 20 | 20 | 60 | — | — | 100 | — | — | — | — | −12 | 2,300 |
| C | — | — | — | 100 | — | — | 100 | — | — | — | — | −35 | 140 |

Notes on Table 1
PS = phthalic acid
TPS = terephthalic acid
AS = adipic acid
IS = isophthalic acid
DCS = aliphatic dicarboxylic acid of $C_4$ to $C_6$ - total carbon (mixture of equal parts)
MEG = (mono)ethylene glycol
DEG = diethylene glycol
HD = 1,6-hexanediol
TTE = trimellitic acid alkyl ester
GV = glycidyl ester of versatic acid 10
TMME = trimethylolpropane monoester
x = tri-2-ethylhexyl ester
xx = versatic acid-10-ester
xxx = mono-2-ethylhexyl ester
x2 = monolauryl ester
x3 = coconut fatty acid ester an acid number of less than 2 when the hydroxyl number of 40 is reached. The molecular weights (M) are between 2,600 and 3,500.

Example Ia

Preparation of the monoester from 2-ethylhexanic acid and trimethylolpropane 165.6 g of 2-ethylhexanic acid (1.15 mol) was heated under nitrogen gas in a round flask surmounted by a column and equipped with thermometer and stirrer, and 134.0 g of trimethylolpropane (1.0 mol) plus 0.86 g of ester of phosphorous acid ($H_3PO_3$) prepared from versatic acid glycidyl ester and $H_3PO_3$, and 0.137 g of a 36.8% solution of butyl titanate was added. In 60 minutes 185° C. was reached, with incipient splitting off of the reaction water.

The reaction temperature was then released to 255° C. After 93.6% of the reaction water had distilled off, the column was removed and changed to the bottom way. Upon reaching an acid number of about 6.2 mg KOH/g, the condensation was terminated by cooling the product. 1.0 mol of 2-ethylhexanic acid is contained in the product per mol of trimethylolpropane. Example Ib Trimelliticacid-2-ethylhexyl ester 193 g (1 mol) of trimellitic acid anhydride and 234 g (1.8 mol) of 2-ethylhexanol plus 0.2 g of octylene glycol titanate were placed in a one-liter round flask. The mixture was heated to 150° C. with stirring and the introduction of nitrogen gas, and the splitting off of water begins. Within 4 hours the temperature is raised

Examples 12 to 15

Example 2 is repeated, but the amount of the glycidyl ester is varied, namely to 2 (Example 12), 20 (Example 13), 40 (Example 14) and 70 (Example 15), so that 98 mol-% of diethylene glycol is contained in the product in Example 12, and in the following examples 80, 60 and 30 mol-% of diethylene glycol is contained in the product, and an excess of diethylene glycol corresponding to Example 2 is used in the batch.

As the glycidyl ester content increases the setting point Tg and the viscosity decrease.

Examples 16 to 18

Example 3 is repeated, but the product contains 5 mol-% (Example 16), 20 mol-% (Example 17) and 50 mol-% of trimethylolpropane-mono-2-ethylhexyl ester (Example 18), and accordingly 60 mol-% (Example 16), 45 mol-% (Example 16) and 15 mol-% (Example 17) of MEG with the same proportions of 35 mol-% of 1,6-hexanediol and 50 mol-% each of isophthalic acid and adipic acid. An excess of MEG is added to the batch and removed as the polycondensation progresses. The product has a hydroxyl number of 40.

Example 19

Polyester with alkyl side chains:

| | |
|---|---|
| from adipic acid | 60 mol % |
| phthalic acid anhydride | 40 mol % |

-continued

| | |
|---|---|
| Cardura E 10[R] | 33 mol % |
| 1,6-hexanediol | 55 mol % |
| neopentyl glycol | 12 mol % |

By the procedure of Example 2, an alkyl side-chain polyester was prepared from the following starting substances: Glycidyl ester of versatic acid E10 (Cardura ® E10=8.89 kg, 1,6-hexanediol=7.66 kg, neopentyl glycol=1.48 kg, and the acid components adipic acid=8.94 kg, phthalic acid anhydride=6.04 kg, plus Dynapol A1V ® (cf. Example 2)=67 g, and octylene glycol titanate=22.5 g.

Characteristics: Acid number <1, hydroxyl number 30, $V_{20}$=795 Pa.s, Tg=31° C.

Example 20

Polyester with alkyl side chains of the composition:

| | |
|---|---|
| adipic acid | 40 mol % |
| phthalic acid anhydride | 40 mol % |
| isophthalic acid | 20 mol % |
| Cardura[R] E10 | 33 mol % |
| 1,6 hexanediol | 40 mol % |
| neopentyl glycol | 7 mol % |

By the procedure of Example 2, the polyester was prepared from the following starting materials: glycidyl ester of versatic acid 10 (Cardura ® E10)=8.78 kg, 1,6-hexanediol=6.89 kg, neopentyl glycol=2.07 kg, adipic acid=5.89 kg, phthalic acid anhydride=5.97 kg, isophthalic acid=3.35 kg, plus Dynapol A1V ®=67 g, and octylene glycol titanate=22.5 g.

The polyester obtained had the following characteristics: Acid number <1, hydroxyl number 38, $V_{20}$=2,610 Pa.s, Tg=−22° C.

Example 21

Polyester with alkyl side chains of the composition:

| | |
|---|---|
| adipic acid | 100 mol % |
| 1,6-hexanediol | 35 mol % |
| monoethylene glycol | 25 mol % |
| trimethylolpropane monoester of ethylhexylic acid | 40 mol % |

By the procedure of Example 2, a polyester was made from the following starting substances: adipic acid=15.19 kg, 1,6-hexanediol=4.97 kg, monoethylene glycol=1.87 kg, trimethylolpropane monoethylhexyl ester (cf. Example Ia)=13.40 kg, plus dynapol A1V ®32 30 g, and octylene glycol titanate=15 g.

Characteristics: Acid number <1, OH number 24, $V_{20}$ =Pa.s, Tg=−50° C.

Examples of Functionalization with Acrylates

Example IIa

Preparation of the IPDI/HEA 1 : 1 adduct:

| Raw materials for 100 kg: | |
|---|---|
| isophorone diisocyanate (IPDI) | 65.68 kg |
| 2-hydroxyethyl acrylate (HEA) | 34.32 kg |
| dibutyltin dilaurate (DBTL) | 50 grams |
| polymerization inhibitor (2,6-di-tert.-butyl-4-methylphenol) | 50 grams |

IPDI, DBTL and the polymerization inhibitor are placed in a reactor and heated to 40° C. HEA is fed in at a uniform rate for 3 hours. As soon as the temperature rises to 60° C. due to exothermic reaction, the mixture is cooled so that the temperature does not exceed 80° C., but does not fall below 50° C. After the addition of HEA is ended, the reactor contents are held at 60° C. until the NCO content has decreased to 12.2% two hours later. Viscosity 8,000 to 12,000 mPa.s at 20° C. The product can be handled for a short time in open air, but to keep it longer it must be protected against atmospheric humidity in closed drums.

Functionalization of Polyesters by Acrylation

Example F1

The polyester from Example 2 is cooled to 120° C. immediately after preparation and the vacuum is adjusted to 400 mbar, or a ready-made polyester according to Example 2 is heated at 120° C. in a vacuum of 400 mbar. While stirring, 100 kg each of the polyester of Example 2 and 12.5 kg of the adduct of Example IIa are added and stirred for 1 hour until the NCO content has diminished to less than 0.2%.

By this reaction the hydroxyl groups of the polyester of Example 2 are reacted from an original hydroxyl number of 40% to 50%, so that now acrylate moieties are in place of half of all the hydroxyl groups. Such a product is called A50. Viscosity at 50° C. 114 Pa.s, Tg −5° C.

Examples F2 and F3

In the same manner as in Example F1, the polyester of Example 2 is reacted with 7.5 kg (Example F2) and 17.5 kg (Example F3) of the adduct according to Example IIa. In Example F2, the functionalization amounts to 30% of the hydroxyl groups present in the polyester (product A 30). The viscosity at 50° C. amounts to 192 Pa.s, Tg −10° C.

The product of Example F3 is 70% functionalized (Product A 70). The viscosity at 40° C. is 310 Pa.s, Tg −4° C.

Example F4

By the procedure of Example F1, the polyester of Example 1 is made to react with 12.5 kg of the product of Example IIa for every 100 kg of the polyester. A product is formed in which 50% of the hydroxyl groups have been functionalized. Viscosity at 50° C. is 35 Pa.s, Tg −32° C.

Example F5

The polyester of Example 3 is made to react with 12.5 kg of the adduct of Example IIa by the method of Example F1. A functionalized polyester results, having a viscosity at 50° C. of 88 Pa.s, Tg −25° C.

Example F6

The polyester of Example 2 is heated to 150° C. with stirring, and 11.8 kg of steel acid anhydride per 100 kg of the polyester. After 30 minutes the hydroxyl number has fallen to 17 kg KOH/g, while the acid number reaches 18 mg KOH/g. Then 9.1 kg of glycidyl methacrylate plus 50 g of hydroquinone as polymerization inhibitor are added, and the mixture is reacted for another 30 minutes at 150 to 170° C., with stirring. The product is cooled and bottled. The acid number is 2 mg KOH/g, the viscosity at 20° C. is 4,500 Pa.s, Tg −10° C.

Example F7

The polyester from Example 2 is heated at 150° C. with stirring. For every 100 kg of the polyester, 4.6 kg of methylacrylamidoglycolate methyl ether (MAGME) plus 50 g of p-toluenesulfonic acid and 50 g of hydroquinone are added, and then the mixture is allowed to react for another 50 minutes at 150° C.

A polyester forms in which 50% of the hydroxyl groups are acrylated.

Viscosity at 20° C. 4,300 Pa.s, Tg −15° C.

Example F8

The addition of resin.

The functionalized polyester of Example F2 is homogenized in a kneader at 70° C. in amounts of 800 parts with 200 parts of polyvinyl methyl ether (Lutonal M 40 of BASF).

Whenever the crosslinking is performed with ultraviolet radiation, 1% of Darokur 1173 made by Merck is added as photoinitiator.

Crosslinking to Produce Pressure-Sensitive Adhesives from Functionalized Polyesters

V1—Electron Beam Crosslinking

By means of a wire rod at 100° C., one of the functionalized polyesters listed in the F examples is applied to a paper of 80 g/m$^2$ or to a corresponding plastic film, at a rate of 20 g/cm$^2$, and crosslinked with an electron beam apparatus (Elektrocurtain made by Energy Sciences Int.) at a dosage of 3 Mrad. V2—Ultraviolet Radiation Crosslinking The method of application described under V1 and the polyester specified therein are used in the same manner and at the same temperature, 1% of Darocur 1173 (Merck) being always distributed as photoinitiator in the functionalized polyester.

The crosslinking is performed by irradiation for 0.5 sec by means of an ultraviolet radiator made by Theimer, with a beam power of 100 W/cm.

Application temperatures from 50° C. up can be selected, provided the functionalized polyesters have a low viscosity as specified above.

The properties of the adhesives thus obtained are given in the following table.

TABLE 2

| Polyester No. Examples | Degree of acrylation | Cross-linking | Peel Adhesion (N/2.5 cm) | Shear Adhesion | Quick-Stick (N/2.5 cm) | Rolling Ball |
|---|---|---|---|---|---|---|
| 1 + F4 | 50 | UV | 4 | 10 min. | 2 | — |
| 3 + F5 | 50 | UV | 20 | 2.5 h | 5 | 4 |
| 3 + F5 | 50 | EB | 10 | 2.0 h | 5 | 20 |
| 2 + F2 | 30 | EB | 18 | 9.0 h | 18 | 20 |
| 2 + F1 | 50 | UV | 19 | 45 min | — | 20 |
| 2 + F3 | 70 | UV | 4 | 2.0 h | — | 20 |
| 2 + F8 | 30 | EB | 23 | 24.0 h | 20 | 20 |
| 2 + F7 | 50 | UV | 20 | 8.0 h | — | 20 |
| 2 + F6 | 50 | UV | 12 | 2.0 h | — | 20 |

Examples F9 through F13

One mol of one of the diisocyanates listed below is placed in each case in a one-liter round flask at room temperature. With stirring and the introduction of nitrogen, 116 g of hydroxyethyl acrylate is added drop by drop over a period of one hour. 30 minutes later the NCO content originally present in the mixture has fallen by one-half.

| Example | Diisocyanate | NCO Content of the adduct | Amt. added to 800 g of the polyester· |
|---|---|---|---|
| F 9 | toluylene diisocyanate | 14.5% | 37.2 g |
| F10 | methylenediphenyl-4,4'-diisocyanate | 11.5% | 47.0 g |
| F11 | hexamethylene diisocyanate | 14.8% | 36.4 g |
| F12 | benzene-1,4-di-isopropyliso-cyanate | 11.7% | 46.2 g |
| F13 | isophorone diisocyanate | 12.4% | 43.4 g |

As in Example F8, 800 g of the polyester described in Example 22 is reacted with the amounts of diisocyanatehydroxyethylacrylate adduct listed in the table, so that the resultant NCO content of the product is less than 0.1%.

Example 22

Preparation of the Polyesters for Examples F9 through F13

700 g of the trimellitic acid-2-ethylhexyl ester of Example 14 is heated with 202 g of ethylene glycol, with stirring and the introduction of nitrogen, in a two-liter round flask. The release of water begins at about 180° C.; the reaction water is distilled out through a Vigreux column and distillation bridge at a top temperature of 100° to 105° C.

Over a period of three hours the temperature is raised from 180° C. to 210° C. Now, 0.6 g of octylene glycol titanate is added as esterification catalyst and stirred for another hour at 210° C. Then another 0.3 g of octyl glycol titanate is added and, after removing the distillation apparatus, a vacuum is applied, which is reduced over 30 minutes to 10 mbar. Condensation is continued until the desired characteristics are achieved, namely hydroxyl number =40 mg KOH/g at an acid number of less than 1 mg KOH/g.

Example F14

800 grams of the polyester described in Example F9 are reacted with 8.2 g of trimellitic acid anhydride at 150° C., and then at 80° C., in a manner similar to Example F9, with 20 g of isocyanatoethyl methacrylate, so that the resultant NCO content is less than 0.1%.

Examples F15 and F16

In a one-liter round flask, at a temperature of 80° C., 800 g of the polyester described in Example F9 is reacted with 39 g and 65 g, respectively, of a 1 : 1 adduct of toluylene diisocyanate and 2-ethylhexanol (NCO =13.8%). In this manner some of the hydroxyl groups are replaced by urethane groups. Then these products are functionalized as in Example F9 with 26.7 and 20.0 g of isocyanatoethyl methacrylate, so that the resultant NCO content is less than 0.1%.

It will be understood that the specification and examples are illustrative but not limitative of the present invention in that other embodiments within the spirit and scope of the invention will suggest themselves to those skilled in the art.

What is claimed is:

1. Radiation-curable macromers based on (meth)acrylate-functional polyesters, comprising (a) base polyesters which are hydroxyl polyesters liquid at room temperature having hydroxyl numbers of 10 to 100, acid numbers lower than 5, a glass transition temperature lower than 0° C., and average molecular weight of from 2,000 to 5,000, said polyesters being fluid at 20° C. and having straight-chain alkyl or branched alkyl side chains of 4 to 36 carbon atoms directly bound through ester bonds or ether bonds of at least one of trifunctional or polyfunctional carboxylic acids, triols or polyfunctional polyols and hydroxydicarboxyclic acids along the main chain of the polyesters, the molar ratio of ester segments of the main chain to the alkyl side chains ranging from 1:0.2 to 1:2.0, and in which 10 to 90% of the hydroxyl groups of said polyesters have been reacted with (b) acrylate compounds or methacrylate compounds having additional reactive groups capable of reacting with the hydroxyl groups of said polyesters.

2. The macromers of claim 1 in which the acrylate compounds or methacrylate compounds are selected from the group consisting of (b1) isocyanatoalkylacrylate or isocyanatoalkylmethacrylate, (b2) adducts of di- or tri-isocyanates or polyisocyanates or isocyanato prepolymers of polyesters or polyethers of low molecular weight with hydroxyalkylacrylates or hydroxyalkylmethacrylates.

(b3) methylacrylamidoglycolate methyl ethers, (b4) methacrylic acid or acrylic acid or their derivatives, (b5) the reaction product of glycidylacrylate or glycidylmethacrylate with carbonyl groups formed by the reaction of the hydroxyl groups of the polyesters with a dicarboxylic acid, a tricarboxylic acid or their anhydrides, and mixtures thereof.

3. The macromers of claim 1, wherein 30 to 70% of the hydroxyl groups of the polyesters are reacted with acrylate compounds or methacrylate compounds.

4. The macromers of claim 1, wherein the portion of the hydroxyl groups of the polyesters that has not reacted with acrylate compounds or methacrylate compounds is preserved as hydroxyl groups.

5. The macromers of claim 1, further containing tackifying resins, pigments, anti-aging agents or fillers.

6. The macromers of claim 2, in which the acrylate compounds or methacrylate compounds are adducts of di- or tri-isocyanates or polyisocyanates or isocyanato prepolymers of polyesters or polyethers of low molecular weight with hydroxyalkylacrylates or hydroxyalkylmethacrylates.

7. The macromers of claim 6, in which the acrylate compounds or methacrylate compounds are prepared from substantially equivalent amounts of isocyanate compounds and hydroxyalkylacrylates or hydroxyalkylmethacrylates.

8. The macromers according to claim 7, in which the isocyanate compounds is selected from the group consisting of toluylene diisocyanate, methylenediphenyl-4,4′-diisocyanate, hexamethylenediisocyanate, benzene-1,4-diisopropylisocyanate, and isophoronediisocyanate.

9. The macromers according to claim 8, in which the acrylate compound is prepared from isophoronediisocyanate and 2-hydroxyethylacrylate.

10. The macromers according to claim 8, in which the acrylate compound is prepared from toluylene diisocyanate and 2-hydroxyethylacrylate.

11. The macromers of claim 1, wherein the base polyesters have glass transition temperatures lower than −20° C.

12. The macromers of claim 1, wherein the base polyesters bear alkyl side chains of 4 to 18 carbon atoms.

13. The macromers of claim 12 wherein the base polyesters bear alkyl side chains of 8 to 18 carbon atoms.

14. The macromers of claim 12, wherein the alkyl side chains of the base polyesters are branched.

15. The macromers of claim 1, wherein the base polyesters, prior to the reaction with acrylate compounds, have hydroxyl numbers from 20 to 60.

16. The macromers of claim 1, wherein, in the polyesters, the molar ratio of the ester segments of the main chain to the alkyl side chains ranges from 1:0.05 to 1:1.0.

17. The macromers of claim 16, wherein the alkyl side chains are the alkyl groups of aliphatic monoalcohol partial esters of tri or polycarboxylic acids said esters having an average of two polyester-forming carboxyl groups.

18. The macromers of claim 17, wherein partial esters are monoester of tricarboxylic acid.

19. The macromers of claim 16, wherein the alkyl side chains are the alkyl groups of aliphatic monocarboxylic acid partial esters of polyols, said esters having an average of two polyester-forming hydroxyl groups.

20. The macromers of claim 19, wherein the partial esters are glycidyl monoesters or trimethylolpropane monoesters.

21. The macromers of claim 16, wherein the alkyl side chains are the alkyl groups of aliphatic monoalcohol partial ethers of polyols, said ethers having an average of two polyester-forming hydroxyl groups.

22. The macromers of claim 21, wherein the partial esters are monoether of triol.

23. The macromers of claim 16, in which the base polyester is prepared from trimellitic acid tri-2-ethylhexyl ester.

24. The macromers of claim 16, in which the base polyester is prepared from trimethylolpropane mono-2-ethylhexanoic acid ester.

* * * * *